United States Patent [19]

Canella et al.

[11] 4,436,756

[45] * Mar. 13, 1984

[54] METHOD FOR EXTRACTING MYCOTOXINS FROM VEGETABLE FLOURS

[75] Inventors: Marco Canella; Giancarlo Sodini, both of Rome, Italy

[73] Assignee: E.N.I. Ente Nazionale Indrocarburi, Rome, Italy

[ * ] Notice: The portion of the term of this patent subsequent to Feb. 7, 1995 has been disclaimed.

[21] Appl. No.: 475,915

[22] Filed: Mar. 16, 1983

Related U.S. Application Data

[63] Continuation of Ser. No. 68,141, Aug. 20, 1979, abandoned, which is a continuation of Ser. No. 862,774, Dec. 21, 1977, abandoned, which is a continuation of Ser. No. 705,014, Jul. 14, 1976, abandoned.

[30] Foreign Application Priority Data

Jul. 15, 1975 [IT] Italy ............................... 25422 A/75

[51] Int. Cl.$^3$ .............................................. A23L 1/20
[52] U.S. Cl. .................................... 426/430; 426/429; 426/425; 426/335
[58] Field of Search ............... 426/425, 429, 430, 320, 426/335, 532

[56] References Cited

U.S. PATENT DOCUMENTS

| | | | |
|---|---|---|---|
| 1,098,006 | 5/1914 | Allen | 426/335 |
| 2,383,907 | 8/1945 | Beechem | 426/335 X |
| 3,168,406 | 2/1965 | Mosley | 426/430 X |
| 3,634,093 | 1/1972 | Huang | 426/429 |
| 3,895,003 | 7/1975 | Swain | 426/430 X |
| 4,072,671 | 2/1978 | Sodini et al. | 426/430 X |

OTHER PUBLICATIONS

Chemical Abstracts, 64:7261(b), "Extraction of Aflotoxin from Peanut Products by Dialysis", 1965.
Chemical Abstracts, 83:112574K, Detoxification of Ground & Nut-Oil, Apr. 1975.
"Extraction of Aflotoxin from Cottonseed and Peanut Meals with Ethanol", Journal of the Oil Chemists Society, vol. 47, No. 1, p. 26.

*Primary Examiner*—Joseph M. Golian
*Attorney, Agent, or Firm*—Hedman, Gibson, Costigan & Hoare

[57] ABSTRACT

A method is disclosed for extracting mycotoxins from vegetable flours, wherein an organic solvent containing at least one polar group is used conjointly with an aqueous solution of an electrolyte.

10 Claims, No Drawings

METHOD FOR EXTRACTING MYCOTOXINS FROM VEGETABLE FLOURS

This is a continuation of application Ser. No. 68,141 filed Aug. 20, 1979 now abandoned which is a continuation of Ser. No. 862,774 filed Dec. 21, 1977 now abandoned, which is a continuation of Ser. No. 705,014, filed July 14, 1976 now abandoned.

This invention relates to a method for extracting mycotoxins from cakes, flours and proteinic concentrates of a vegetable nature.

The contamination by mycotoxins of food and fodders can render such products dangerous: as a matter of fact the metabolites of fungi exhibit a wide spectrum of acute and chronic toxis phenomena, among which cancerogenic and teratogenic effects.

Among the different toxines isolated from several pathogenic microorganisms, the aflatoxins, discovered in 1960, have a special importance due to their high biological activity. The toxic factor of aflatoxin has been isolated from cultures of *Aspergillus flavus;* this micromycetes is the most important organism which is responsible for the contamination of several vegetable seeds, such as earth nut, wheat, maize, sunflower, colza and others.

The class of the aflatoxins is composed by a plurality of substances, all chemically similar, which reach in some cases a number of up to 10–12. Four compounds, indicated as aflatoxins $B_1$ $B_2$ $G_1$ $G_2$ are always present. The metabolites $B_1$ and $G_1$ are difuran-coumarin derivatives, whereas $B_2$ and $G_2$ are the respective dihydroderivatives. Aflatoxin $B_1$ is the compound which exhibits the utmost toxicity and is also the main component of the mixture (about 45%).

Methods for the removal and inactivation of these compounds from the contaminated products have been developed by several authors, but all of these methods decreased the nutritional power of flours (E. K. Gardner et al., J. Amer. Oil Chem. Soc., 48, (2), 70–73 (1971).

This invention discloses a novel method which is capable of removing the aflatoxins and all the mycotoxins of similar structure, or anyhow soluble in the mixture of solvents which is employed under conditions which are not degradative for proteins. Thus, the method effects an intense decontamination on cakes, flours and proteinic concentrates, making them adapted to the use as fodders and human foods which had been produced in an initially contaminated condition and were thus toxic.

The method employs a solvent of an organic nature with at least one polar group: such a solvent must be saturated with an aqueous solution which contains an electrolyte having an acidic nature, selected among the organic and inorganic acids or the acidic salts thereof. The electrolyte increases the solubility of the mycotoxins in the hydroalcoholic solution, thus facilitating their removal.

The extraction process is carried out within an interval of temperatures from 4° C. to the temperature at which the denaturation of the proteins begins, with a solute to solvent ratio of from 1:2 to 1:5, or by exhaustive percolation of the extracting solution with a pH which varies from 2.0 to 6.0.

To illustrate the process in detail, reference will be made as the present disclosure proceeds, to the extraction of the aflatoxins $B_1$ and $B_2$ from an earth nut flour coming from the oil industry. It is apparent that the process can also be applied with advantage to other vegetable flours as contaminated by aflatoxins or by other mycotoxins having a similar structure, or anyhow soluble in the solvent mixture as used in the present method, such as for example the class of the ocratoxins, which are metabolites of the *Aspergillus ochraceus* and the *Penicillium viridicatum.*

Further details will be emphasized in the examples which are given for a better understanding of the invention, which, however, are not to be construed as limitations of the invention.

To perform the examples, the following materials have been used and the following procedures have been followed.

Materials

The samples of aflatoxins $B_1$ and $B_2$ have been supplied by Calbiochem. The silica gel support for the chromatographic analyis on thin layer was MN-silica gel, G-HR of Macherey, Nagel & Co., The eluent used was a solution of chloroform: acetone (90:10).

Nor. butyl alcohol and nor. hexane were supplied by Carlo Erba as RPE solvents (Erba Pure Reagent).

Hydrochloric acid was from Merck.

Methods

Dosage of the aflatoxins $B_1$ and $B_2$ has been effected according to the AOAC method 26.001–26.020, 11th Edition (1970) (Association Official Analytical Chemists).

The assay for the quick recognition of aflatoxins $B_1$ and $B_2$ has been carried out according to the method reported by L. M. Seitz and H. E. Mohr, Cereal Chemistry, 51 (4), 487 (1974).

Fluorimetric reading of the spots on thin layer relative to aflatoxins $B_1$ and $B_2$ and of the reference samples has been carried out with a Chromato-Vue using long-wave UV radiations, of Ultraviolet Products, Inc., San Gabriel, Calif., U.S.A.

The extraction solvent for the mycotoxins was formed by a solution of nor.butyl alcohol containing hydrochloric acid ($0.5 \cdot 10^{-2}$ normal), pH 2.50, added in the ratio 9:1 volume/volume. This ratio is not be intended as a limitation and can be varied as a function of the pH until a complete saturation is achieved of the solvent by the aqueous solution which contains the electrolyte.

The earth nut seed flour coming from the industrial installation for the extraction of the oil is powdered with a Bühler mill, grade 3, and is added to the solvent mixture in the ratio of 1/15 weight to volume during 15 minutes at room temperature and with stirring. The suspension is filtered on a Büchner funnel using a Whatman No 3 filter paper. The extraction is repeated on the residue with the solvent mixture several consecutive times in the manner as described above.

On completion of the extraction runs, the flour is dried in a nitrogen stream during at least three hours and on this material an assay is carried out for the quick recognition of the aflatoxins $B_1$ and $B_2$ according to the Seitz and Mohr method. The dosage of aflatoxins is carried out, conversely, with the method AOAC 26.011–26.020.

EXAMPLE 1

Extraction of the aflatoxins $B_1$ and $B_2$ from a deoiled sample of earth nut flour with the method of Seitz and Mohr Initial composition of the earth nut flours for oil extraction:

| | |
|---|---|
| Moisture | 8.4% |
| On the dry substance: | |
| proteins | 58.7% |
| lipids | less than 1% |
| Crude fiber | 5.1% |

100 Grams of flour are admixed in a flask with 1,500 mls of the solvent mixture during 15 minutes at room temperature with vigorous stirring. Filtration is carried out with a filter pump and the extraction is repeated on the residue with 1,500 additional mls of fresh solvent. This treatment is carried out repeatedly for a total of seven extraction. The final residue is then dried in a nitrogen stream during three hours.

50 Grams of the toxin-stripped flour are then treated according to the Seitz and Mohr method for recognizing aflatoxins. An identical quantity of untreated earth nut flour is subjected to the above described procedure.

On a thin-layer plate there are charged 25 microliters of a solution in benzene:acetonitrile (98:2) of the initial earth nut flour of the treated flour and four aflatoxin stabdards which contain 10, 20, 30 and 50 parts per billion, respectively, of aflatoxins $B_1$ and $B_2$. The preparation of the standards has been effected by properly diluting the aflatoxins $B_1$ and $B_2$, grade A, in a solution of benzene-acetonitrile (98:2) so as to obtain a final concentration equal to about 1 microgram per milliliter. The actual concentration was then determined by spectro-photometric methods according to the procedure of AOAC 26.011.

The plate is eluted during 10 minutes in chloroform:acetone (90:10) and then it is read out under an U.V. light at a high wavelength.

On inspecting the plate, in the starting samples there were visible two characteristic spots with a blue fluorescence with Rf which correspond to the standards of aflatoxins $B_1$ and $B_2$. The spots relative to the untreated sample had an intensity which was much higher than the most concentrated standard, whereas the spots of the plate which had been subjected to the extraction process with the solvent mixture exhibited a fluorescence intensity which was comparable with the lowest concentration of the standard solutions, that is equal to 10 parts ber billion.

EXAMPLE 2

Extraction and dosage of aflatoxins $B_1$ and $B_2$ from a sample of earth nut flour coming from the oil industry according to the AOAC 26.001–26.020 method 100 Grams of earth nut flour having a composition identical to that reported in Example 1 are admixed in a flask with 1,500 mls of a solvent mixture during 15 minutes at room temperature with vigorous stirring. Filtration is carried out with a filter pump and on the residue the extraction is repeated with 1,500 additional mls of fresh solvent. This treatment is carried out repeatedly for a total of seven extractions and the end residue is dried in a nitrogen stream during three hours.

50 Grams of the toxin-stripped flour of the same composition as reported in the Example 1, are treated according to the AOAC 26.001–26.020 method for the dosage of aflatoxins, which, once they have been extracted, are solubilized in 0.5 ml of a 98:2 benzene-acetonitrile solution. An identical quantity of untreated earth nut flour is subjected to the abovementioned AOAC test procedure.

On a plate on which a layer of 0.3 mm of MN-silica gel G-HR of Machery had been deposited, the following samples have been charged:

1. Sample contaminated by aflatoxins

There are deposited 3.5 and 7 microliters of the solution in benzene-acetonitrile 98:2 of the contaminated earth nut flour sample and 5 microliters of the standard solution of aflatoxin $B_1$ together with 5 microliters of the contaminated sample.

2. Standards

There have been deposited 3.5 and 7 microliters of a standard solution of afloxin $B_1$, 1 microgram/milliliter.

3. Toxin-stripped sample

There are deposited 5, 10 and 15 microliters of the solution in benzene:acetonitrile 98:2 of the sample of toxin-stripped earth nut flour and 5 microliters of the standard solution of aflatoxin $B_1$ together with 5 microliters of the non contaminated sample.

The eluent used for the chromatography was composed by chloroform and acetone in the ratio 90:10 for the duration of 40 minutes, corresponding to a travel of the solvent front through 12 centimeters.

From the plate viewed with a U.V. lamp of Chroma-to-Vue with long wave UV radiations, the following data were obtained:

1. Sample contaminated by aflatoxins

The blue fluorescence spot in correspondence with the 3 microliters of the initial sample diluted 5 times exhibited an identical intensity and Rf of that of the 5 microliters of the aflatoxin $B_1$ standard. To calculate the quantity expressed in parts per billion of aflatoxin $B_1$ contained in the initial flour, the following formula has been applied, as reported in the AOAC 26.020 method:

$$\text{micrograms per Kilogram} = \frac{S \cdot Y \cdot V}{X \cdot W}$$

wherein:

S=microliters of $B_1$ standard

Y=concentration of the $B_1$ standard

V=microliters of final dilution of the sample

X=microliters of the deposited sample which give the same fluorescence intensity as the $B_1$ standard.

W=grams of flour sample employed for the analysis

The result is thus:

$$\text{micrograms per kilogram} = \frac{5 \cdot 1 \cdot 2500}{3 \cdot 10} = \text{417 parts per billion (0.47 ppmillion)}$$

3. Toxin-stripped sample

The blue fluorescence spot in correspondence with the 15 microliters of the toxin-stripped sample exhibited the same intensity and Rf as that of the 3 microliters of standard of aflatoxin $B_1$.

To calculate the parts per billion (p.p.b.) of residual aflatoxin $B_1$ in the toxin-stripped earth nut flour, the formula as reported above has been applied:

$$\text{micrograms per kilogram} = \frac{3 \cdot 1 \cdot 500}{15 \cdot 10} = 10.0 \text{ p.p.b.} (0.01 \text{ ppm})$$

that which gives a residual contents of aflatoxin $B_1$ equal to 2.5% of the initial value.

The same procedure has been applied to standards of aflatoxin $B_2$, and a residual contents of $B_2$ equal to 2.5% of the initial value was also obtained.

What we claim is:

1. A method for the extraction of mycotoxins from mycotoxin contaminated vegetable flours comprising the step of treating said flours or the products obtained with an organic solvent which contains at least a polar group, admixed with an aqueous solution of an electrolyte having an acidic nature.

2. A method for the extraction of mycotoxins from vegetable flours according to claim 1, wherein the ratio of solute to solvent varies from 1:2 to 1:50.

3. A method for the extraction of mycotoxins from vegetable flours according to claim 1, wherein the pH of the aqueous solution of the elctrolyte varies from 2.0 to 6.0.

4. The method for the extraction of mycotoxins from vegetable flours according to claim 1, wherein the operation is carried out at a temperature in the range from 4° C. to the temperature of denaturation of the proteins.

5. A method for the extraction of mycotoxins from vegetable flours according to claim 1, wherein the organic solvent is nor butyl alcohol.

6. A method for the extraction of mycotoxins from vegetable flours according to claim 1, wherein the electrolyte is an inorganic acid.

7. A method for the extraction of mycotoxins from vegetable flours according to claim 6, wherein the acid is hydrochloric acid.

8. A method for the extraction of mycotoxins from vegetable flours according to claim 1, wherein the product is earth nut flour.

9. A method for the extraction of mycotoxins from vegetable flours according to claim 8, wherein the earth nut flour comes from the industrial process for the extraction of the oil.

10. A method for the extraction of mycotoxins as defined in claim 8, said method consisting of the step of treating said earth nut flour with a solvent which consists of a mixture of n-butyl alcohol and hydrochloric acid having pH of from 2.0 to 6.0 with a solute solvent ratio of 1:2 to 1:50 and a temperature of from 4° C. to the denaturation temperature of the protein of the earth nut floor.

* * * * *